(12) United States Patent
Lackner et al.

(10) Patent No.: US 8,967,252 B2
(45) Date of Patent: Mar. 3, 2015

(54) SYSTEMS, METHODS, AND DEVICES FOR TAGGING CARBON DIOXIDE STORED IN GEOLOGICAL FORMATIONS

(75) Inventors: Klaus S. Lackner, Dobbs Ferry, NY (US); Juerg M. Matter, New York, NY (US); Ah-Hyung Alissa Park, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 461 days.

(21) Appl. No.: 13/319,103
(22) PCT Filed: May 11, 2010
(86) PCT No.: PCT/US2010/034306
§ 371 (c)(1), (2), (4) Date: Jan. 4, 2012
(87) PCT Pub. No.: WO2010/132395
PCT Pub. Date: Nov. 18, 2010

(65) Prior Publication Data
US 2012/0103602 A1    May 3, 2012

Related U.S. Application Data

(60) Provisional application No. 61/177,145, filed on May 11, 2009.

(51) Int. Cl.
*E21B 47/00* (2012.01)
*E21B 41/00* (2006.01)
(Continued)

(52) U.S. Cl.
CPC ............ *E21B 41/0064* (2013.01); *B01F 5/0496* (2013.01); *E21B 47/1015* (2013.01);
(Continued)

(58) Field of Classification Search
CPC ........ B01J 9/00; E21B 47/00; E21B 47/1015; E21B 41/0064; G01V 15/00

USPC ................................. 166/250.12, 250.01
See application file for complete search history.

(56) References Cited

U.S. PATENT DOCUMENTS 4,551,154 A    11/1985   Malcosky et al.
4,702,418 A    10/1987   Carter et al.
(Continued)

FOREIGN PATENT DOCUMENTS

WO    2009056855 A1    5/2009

OTHER PUBLICATIONS

International Search Report and The Written Opinion of the International Searching Authority, International Application No. PCT/US2010/034306, filed May 11, 2010.

*Primary Examiner* — Zakiya W Bates
*Assistant Examiner* — Silvana Runyan
(74) *Attorney, Agent, or Firm* — Wiggin and Dana LLP; Anthony P. Gangemi

(57) ABSTRACT

The invention provides methods and systems for tagging carbon dioxide to be stored in a geologic formation. In some embodiments, a method includes: providing a carbon dioxide tracer that is quantifiable and distinguishable versus non-anthropogenic produced carbon dioxide; providing carbon dioxide to be stored in the geologic formation; determining what portion of the carbon dioxide is anthropogenic produced carbon dioxide; and mixing a predetermined quantity of the carbon dioxide tracer with the carbon dioxide stored to develop a tagged quantity of carbon dioxide for storage in the geologic formation. In some embodiments, a system for tagging a stream of carbon dioxide includes a tagging module and a mixing module. Tagging module includes a carbon dioxide tracer that is quantifiable and distinguishable versus non-anthropogenic produced carbon dioxide. Mixing module includes mechanisms for containing and injecting the carbon dioxide tracer into a stream of carbon dioxide.

17 Claims, 5 Drawing Sheets

(51) Int. Cl.
  *B01F 5/04* (2006.01)
  *E21B 47/10* (2012.01)
(52) U.S. Cl.
  CPC ... *F17C2201/0185* (2013.01); *F17C 2221/013* (2013.01); *F17C 2223/0123* (2013.01); *F17C 2223/033* (2013.01); *F17C 2227/0142* (2013.01); *F17C 2227/0192* (2013.01); *F17C 2250/032* (2013.01); *F17C 2250/043* (2013.01); *F17C 2250/0439* (2013.01); *F17C 2250/0452* (2013.01); *F17C 2250/0495* (2013.01); *F17C 2250/0636* (2013.01); *F17C 2260/024* (2013.01); *F17C 2265/025* (2013.01); *F17C 2270/0155* (2013.01); *Y02C 10/14* (2013.01)

USPC .................. 166/250.12; 166/250.01

(56) References Cited

U.S. PATENT DOCUMENTS

| | | |
|---|---|---|
| 5,168,927 A | 12/1992 | Stegemeier et al. |
| 6,515,404 B1 | 2/2003 | Wong |
| 6,635,103 B2 | 10/2003 | Sirkar et al. |
| 6,786,591 B2 | 9/2004 | Dunfield et al. |
| 7,223,602 B2 | 5/2007 | Coleman et al. |
| 7,628,203 B2 * | 12/2009 | Mouget et al. ............ 166/250.12 |
| 2003/0056952 A1 * | 3/2003 | Stegemeier et al. ...... 166/250.12 |
| 2007/0028848 A1 | 2/2007 | Lutz |
| 2010/0212891 A1 * | 8/2010 | Stewart et al. ............ 166/250.12 |

* cited by examiner

SYSTEMS, METHODS, AND DEVICES FOR TAGGING CARBON DIOXIDE STORED IN GEOLOGICAL FORMATIONS

CROSS REFERENCE TO RELATED APPLICATION(S)

This application claims the benefit of U.S. Provisional Application Nos. 61/177,145, filed May 11, 2009, which is incorporated by reference as if disclosed herein in its entirety.

STATEMENT REGARDING FEDERALLY SPONSORED RESEARCH OR DEVELOPMENT

This invention was made with government support under DE-FE0001535 awarded by the DOE. The government has certain rights to the invention.

BACKGROUND

Public doubts over safety, permanence and accountability of Carbon Capture and Storage (CCS) have already slowed down its introduction. For example, the United Nations Framework Convention on Climate change in 2006 in Nairobi decided not to sanction geological storage because of political uncertainties. CCS research will have to focus on verification and monitoring to gain the trust of the public at large.

The public will not take on good faith that carbon dioxide ($CO_2$) is safely and permanently stored in geologic reservoirs. Positive proof will be required. Ideally, measurements should provide a complete inventory at any time without having to rely on past measurements. Injection protocols from decades earlier, together with a promise that leakage would not have escaped observation, will be insufficient proof that a specific amount of $CO_2$ remains stored in an underground reservoir.

As in real estate, verifiable monitoring and accounting schemes must be developed for geological storage of $CO_2$. This requires tools for accurate inventory accounting and verification of the amounts of $CO_2$ stored in a reservoir. These tools need to ensure that the amount of $CO_2$ injected is equal to the amount claimed, and that losses during the injection stage and subsequent losses from storage are accurately determined.

However, injection measurements are far easier than accurate inventories of the $CO_2$ that remains stored in the reservoir. Methods that can create such an inventory without having to rely on a historic record of injections and a continuous observation of potential leak paths would be highly preferable. There are a number of dynamic effects that make an accurate accounting of the $CO_2$ difficult. For example, it is possible that a fraction of the $CO_2$ migrates away from the storage reservoir. It may be that the leakage was detected, or it may be that no leakage was detected, since the relatively high background levels of $CO_2$ present in the atmosphere and soil, coupled with seasonal fluctuations in $CO_2$ fluxes, makes an accurate detection of slow leaks difficult. Chemical conversion and dissolution of $CO_2$ open different transport routes and further complicate a full accounting.

Geophysical methods for detecting $CO_2$, in situ are very powerful, but they are qualitative to semi-quantitative. Four-dimensional seismic, crosswell seismic, vertical seismic profiling (VSP), and wireline logging are excellent tools for tracking the migration of $CO_2$ within a reservoir and providing certain information on $CO_2$ concentration and saturation in case of VSP. In addition, several studies have demonstrated that under favorable conditions accumulations on the order of a few thousand tons of $CO_2$ can be detected with seismic monitoring at a depth of one kilometer. Concerns will arise with leakage paths through regions with less favorable conditions and small local accumulations.

Most geophysical detection requires that $CO_2$ is present as supercritical gas and cannot detect geochemical transformations into carbonates, or the dissolution of $CO_2$ into brine. Therefore, they fail in establishing an accurate mass balance. Furthermore, formations that take on $CO_2$ may already contain carbon that was resident in the formation before injection started or that moved into the formation after injection. For example, dissolution of limestone can add additional carbonate ions to the fluid. Depending on the site, the volumes of $CO_2$ involved in these transitions can be very large and thus cannot be ignored. Also, excess pressure in the reservoir will result in changes in the surrounding formation. Even if these changes do not involve $CO_2$ migration, they may be visible in 4D seismic and thus can create false positive signals of leakage. The lack of a signal does not prove the absence of leakage, nor is the presence of a signal sufficient to prove leakage.

SUMMARY

None of the currently suggested approaches to monitoring and verification of geologic storage reservoirs are by themselves able to provide a surveying tool that would allow a self-contained set of measurements to unambiguously determine the amount of carbon stored. Generally, the disclosed subject matter relates to systems, methods, and devices for tagging the $CO_2$ that is injected into a storage reservoir. Tagging creates a means of providing ground truthing of geophysical observations.

The most direct method for monitoring and accounting involves the tagging of the injected $CO_2$ with another carbon or oxygen isotope. Whatever the isotope, it should not be present in the reservoir prior to injection, and would therefore be detectable even in miniscule quantities. Carbon-13 and oxygen-18 do not meet these criteria. Carbon-14 ($^{14}C$) can provide such a tag. The addition of $^{14}C$ at a concentration that does not exceed the level found naturally in atmospheric carbon and surface carbon is sufficient to provide such a tag. At 800 m depth or greater, the $^{14}C$ content of carbon naturally present is zero. This carbon has been out of contact with the atmosphere for so long that it is $^{14}C$ dead. $CO_2$ from fossil fuels is also $^{14}C$ dead. Thus, prior to re-injection of $CO_2$ to be stored, an amount of $^{14}CO_2$ is added that makes the injected $CO_2$ look like natural surface carbon. The $^{14}C$ can be quantitatively measured to verify the amount of $CO_2$ that has been stored in the reservoir.

BRIEF DESCRIPTION OF THE DRAWINGS

The drawings show embodiments of the disclosed subject matter for the purpose of illustrating the invention. However, it should be understood that the present application is not limited to the precise arrangements and instrumentalities shown in the drawings, wherein.

DETAILED DESCRIPTION

Some embodiments of the disclosed subject matter include methods and systems for tagging carbon dioxide to be stored in a geologic formation and for monitoring carbon dioxide stored in a geologic formation. In particular, methods and systems according to the disclosed subject matter include the use of a carbon dioxide tracer that is quantifiable and distinguishable versus non-anthropogenic produced carbon dioxide. An example of an acceptable carbon dioxide tracer is one that includes $^{14}C$.

Carbon-14 activities or concentration are referenced to an international standard known as "modern carbon" (mC). The activity of modern carbon is defined as 95% of the $^{14}C$ activity in 1950 (pre-nuclear bomb atmosphere). Thus, measured $^{14}C$ activities are reported in percent modern carbon (pmC). Ground water and brines in deep reservoirs reveal residence times in the order of thousands of years and are therefore generally $^{14}C$ dead. In addition, carbon in form of carbonate rocks or fossil fuels present in a potential storage reservoir is also $^{14}C$ dead. This zero $^{14}C$ content is ideal for the application of $^{14}C$ as a tracer because only very small amounts of $^{14}C$ are needed to reliably detect the injected $CO_2$. In addition, $^{14}CO_2$ behaves chemically and physically just like normal $^{12}CO_2$. Even chemical conversion from $CO_2$ to carbonate minerals or to organic carbon compounds barely changes the isotopic ratios of carbon. This can be seen from the fact that isotope ratios between stable isotopes are nearly the same everywhere on Earth.

Carbon in the atmosphere and on the surface of the earth contains 1 part per trillion of $^{14}C$. Tagging $CO_2$ with enough $^{14}C$ to make it look like surface carbon would require 1 kg of $^{14}C$ for every gigaton of carbon stored, or for every 3.7 gigatons of $CO_2$. The injected $CO_2$ has the same $^{14}C/^{12}C$ ratio as any naturally occurring surface carbon, e.g., plants, soil, etc. If the carbon injected had resulted from biomass sequestration or from $CO_2$ air capture, additional $^{14}C$ would be unnecessary, given the natural presence of $^{14}C$ in the atmosphere. If instead the $CO_2$ is from a power plant, $^{14}C$ has to be added.

Figure 1:
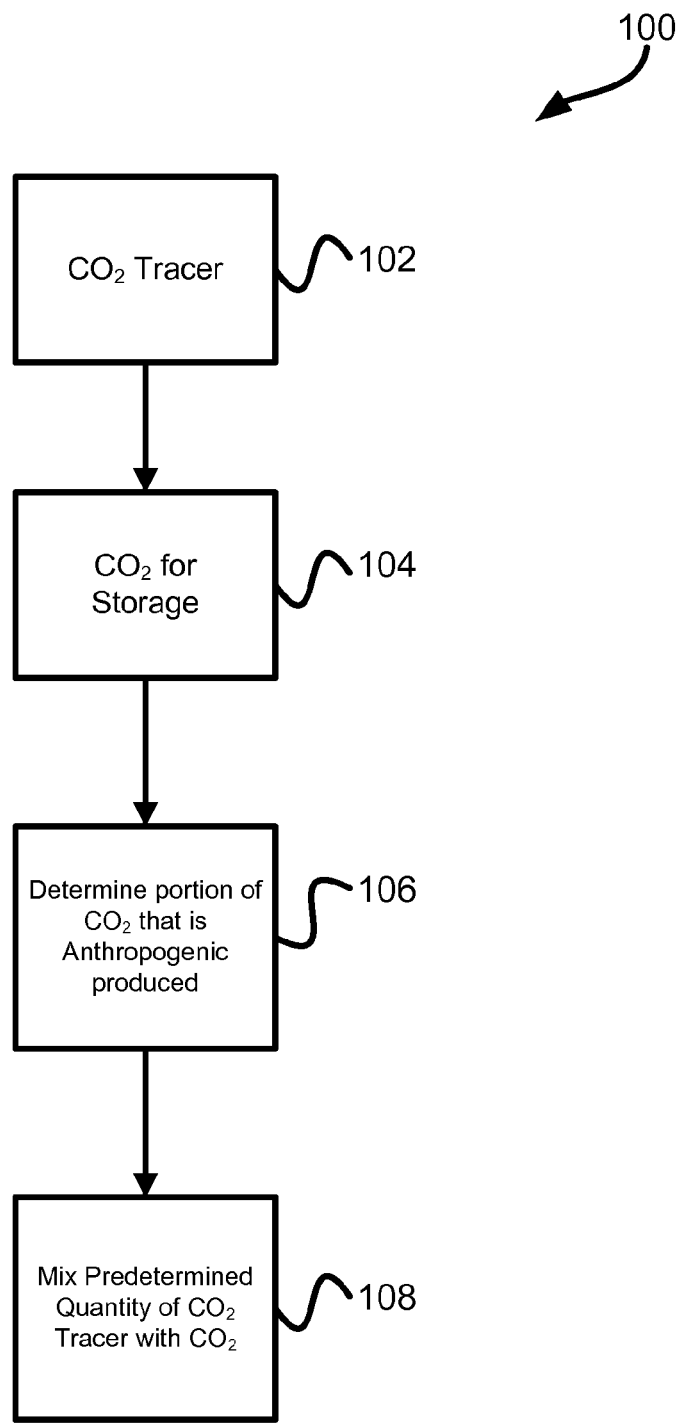
FIG. 1 is a chart of a method according to some embodiments of the disclosed subject matter.

Referring now to FIG. 1, some embodiments include a method 100 of tagging carbon dioxide to be stored in a geologic formation. At 102, a carbon dioxide tracer that is quantifiable and distinguishable versus non-anthropogenic produced carbon dioxide is provided. An example of an acceptable carbon dioxide tracer is one that includes carbon-14 having a concentration of carbon-14 of about 1 part per trillion. At 104, carbon dioxide to be stored in the geologic formation is provided. At 106, the portion of the carbon dioxide that is anthropogenic produced carbon dioxide is determined. At 108, a predetermined quantity of the carbon dioxide tracer is mixed with the carbon dioxide stored to develop a tagged quantity of carbon dioxide for storage in the geologic formation. The predetermined quantity is based on maintaining a predetermined, naturally occurring ratio of non-anthropogenic produced carbon dioxide to anthropogenic produced carbon dioxide. In one embodiment having a 1 kg/sec flow system, 100 micrograms of $^{14}C$ supplies 100,000 seconds of $^{14}C$, which is approximately the quantity necessary for a single day.

Figure 2:
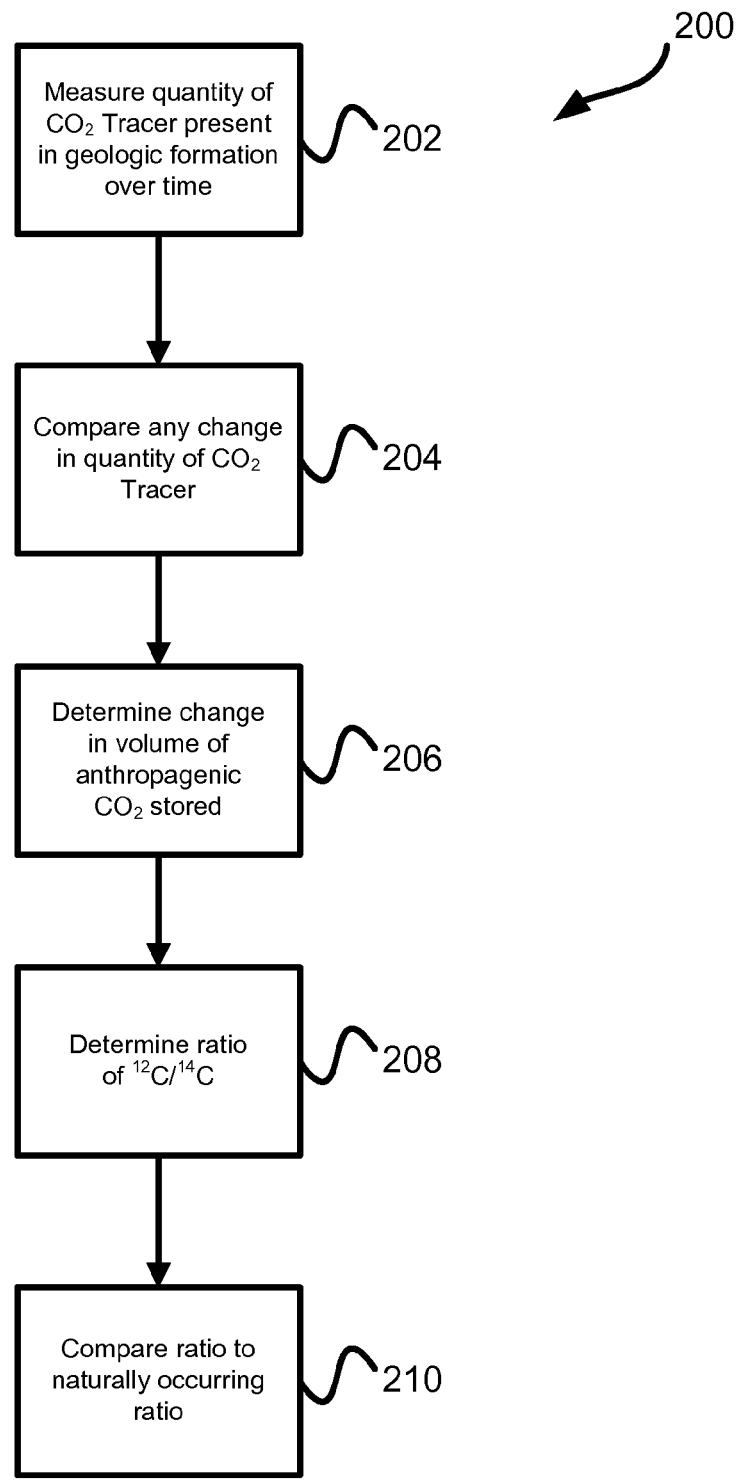
FIG. 2 is a is a chart of a method according to some embodiments of the disclosed subject matter.

Referring now to FIG. 2, some embodiments include a method 200 of monitoring carbon dioxide stored in a geologic formation. At 202, measurements of the quantity of a carbon dioxide tracer present in the geologic formation are taken at a first time and at a second time subsequent to the first time. The carbon dioxide tracer used is quantifiable and distinguishable versus non-anthropogenic produced carbon dioxide. As mentioned above, an example of an acceptable carbon dioxide tracer is one that includes carbon-14 having a concentration of carbon-14 of about 1 part per trillion. At 204, a comparison of the quantity of the carbon dioxide tracer present at the first time to the quantity of the carbon dioxide tracer present at the second time is made to develop a change in quantity of the carbon dioxide tracer. At 206, the change in quantity of the carbon dioxide tracer is multiplied by a known concentration of the carbon dioxide tracer to determine a change in the volume of carbon dioxide stored in the geologic formation. At 208, a ratio of the anthropogenic produced carbon dioxide to the non-anthropogenic produced carbon dioxide is determined. At 210, the ratio is compared to a naturally occurring ratio to verify proper amounts of the carbon dioxide tracer are present in the geologic formation.

Figure 3:
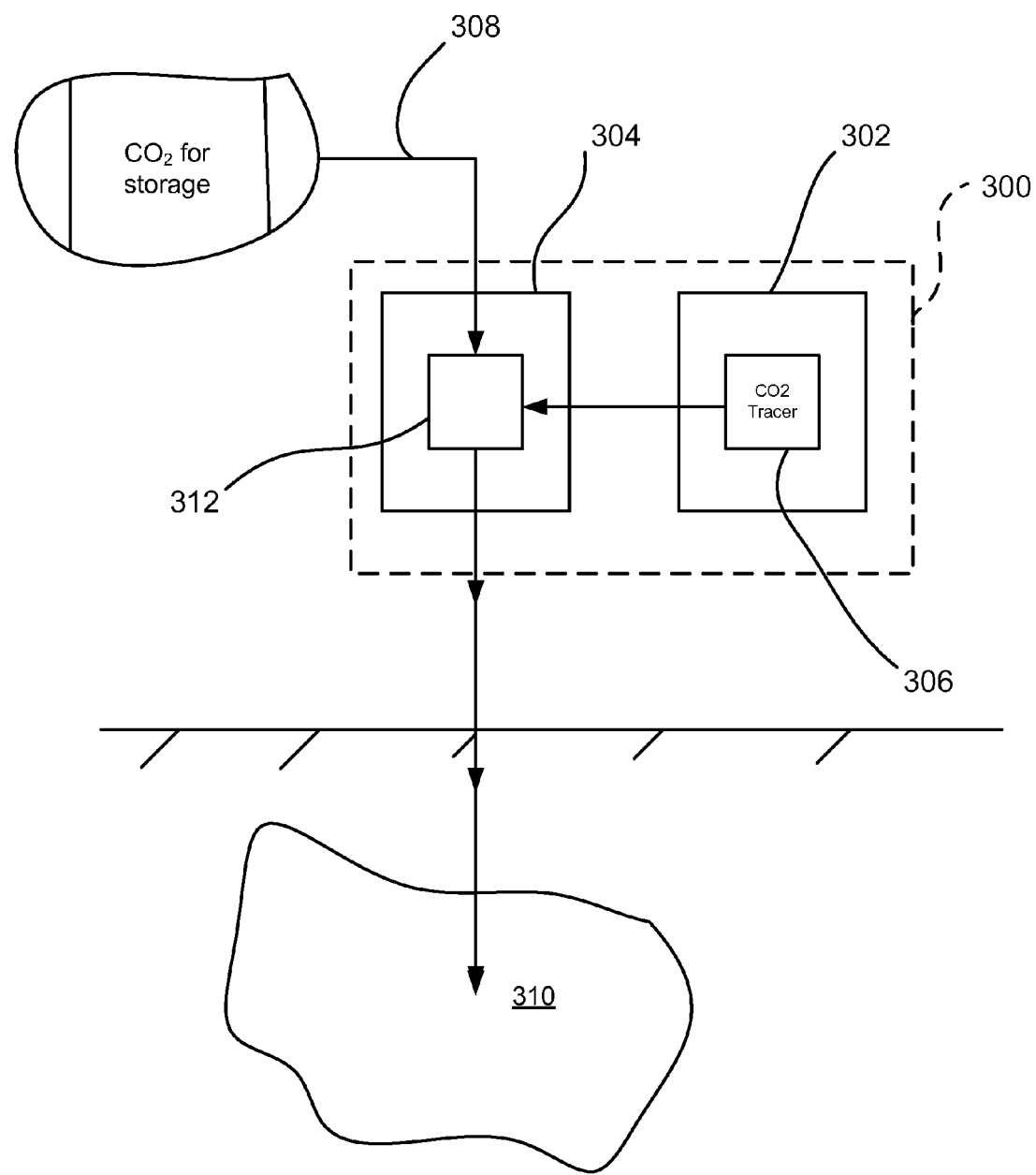
FIG. 3 is a schematic diagram of a system according to some embodiments of the disclosed subject matter.

Referring now to FIG. 3, some embodiments include a system 300 for tagging a stream of carbon dioxide being injected into a geologic storage reservoir. System 300 includes a tagging module 302 and a mixing module 304, which interact to mix a carbon dioxide tracer 306 to tag a stream of carbon dioxide 308 either before or as it is being stored in a geologic storage reservoir 310.

Tagging module 302 includes carbon dioxide tracer 306. Carbon dioxide tracer 306 is quantifiable and distinguishable versus non-anthropogenic produced carbon dioxide. An example of an acceptable tracer is one that includes carbon-14. As explained in elsewhere, tracers including carbon-14 typically have a concentration of carbon-14 of about 1 part per trillion.

Figure 4:
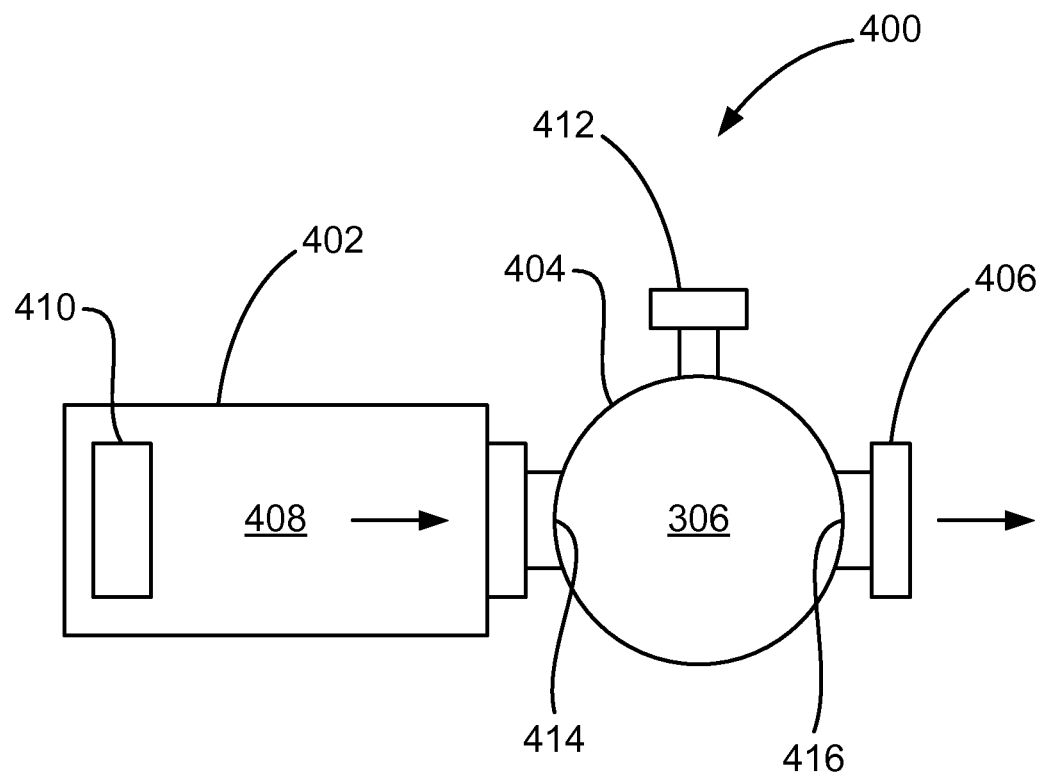
FIG. 4 is a schematic diagram of a device according to some embodiments of the disclosed subject matter.
Figure 5:
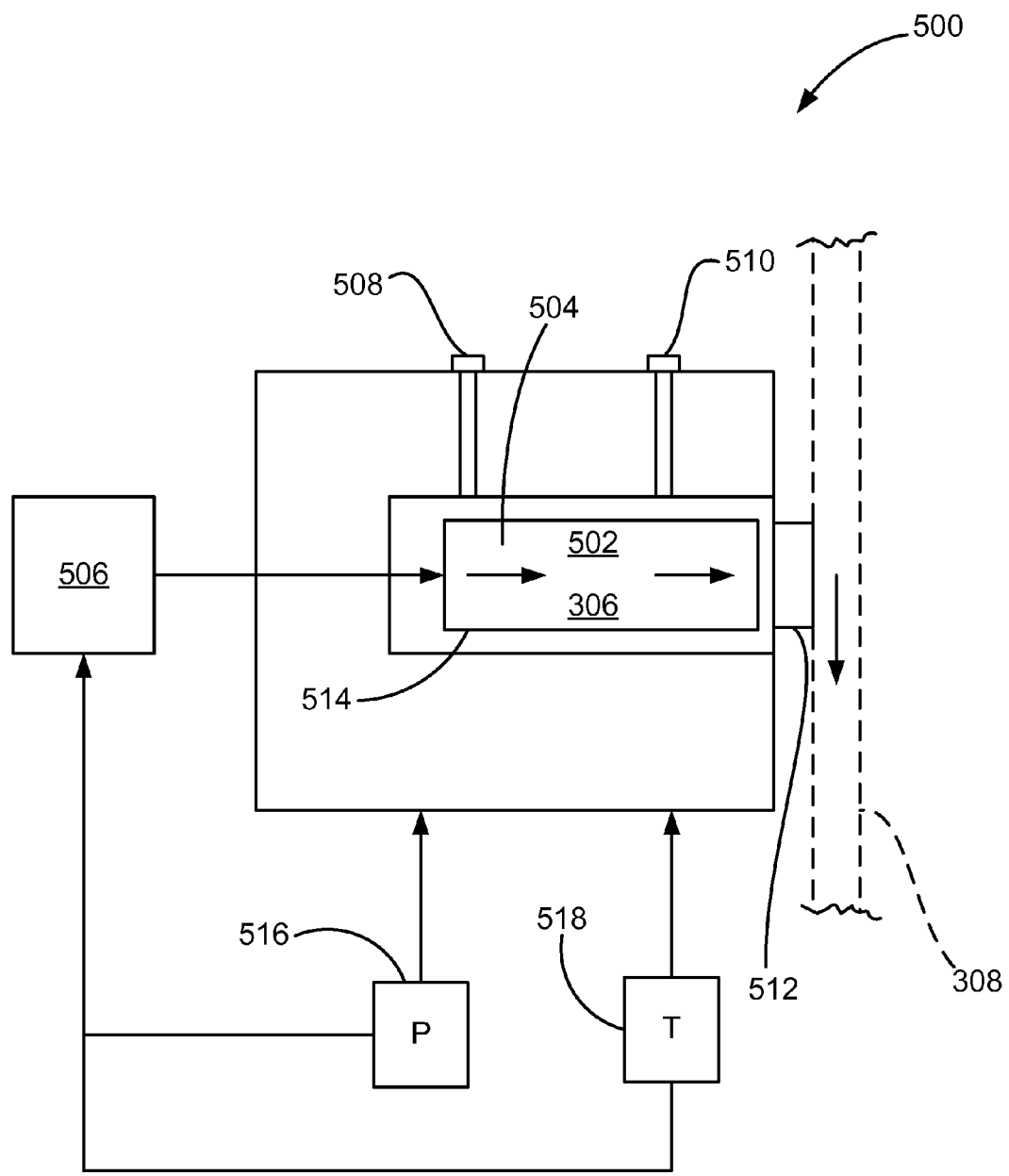
FIG. 5 is a schematic diagram of a device according to some embodiments of the disclosed subject matter.

Mixing module 304 includes a mechanism 312 for containing and injecting carbon dioxide tracer 306 into stream of carbon dioxide 308 at a controlled flowrate over a period of time. Referring now to FIG. 4, in some embodiments, mechanism 312 is a microcartridge 400 for injecting carbon dioxide tracer 306, which is typically in a gaseous form, into stream of carbon dioxide 308. Referring now to FIG. 5, in other embodiments, mechanism 312 is a high pressure syringe device 500 for injecting carbon dioxide tracer 306, which is typically in a liquid form, into stream of carbon dioxide 308

Referring again to FIG. 4, microcartridge 400 includes an actuator reservoir 402, a chamber 404, and a nozzle 406, all of which are fluidly connected.

Actuator reservoir 402 includes a fluid 408 that does not mix with carbon dioxide and a mechanism 410 for pressurizing the fluid. In some embodiments, fluid 408 is a non-toxic liquid metal-alloy such as gallium alloy or another alloy having similar characteristics. Mechanism 410 can be a piezoelectric driver mechanism or a heating circuit for heating fluid 408 and causing it to thermally expand.

Chamber 404 is used to store carbon dioxide tracer 306. Chamber 404 includes a sealable inlet 412, an opening 414, and an outlet 416. Sealable inlet 412 is used for filling chamber 404 with carbon dioxide tracer 306. Opening 414 is in fluid communication with actuator reservoir 402. As indicated by arrows in FIG. 4, as fluid 408 expands, it will enter chamber 404 and act as a piston that pushes carbon dioxide tracer 306 toward outlet 416 to allow carbon dioxide tracer 306 to exit the chamber.

Nozzle 406 is configured to be in fluid communication with outlet 416 of chamber 404. In some embodiments, nozzle 406 is adjustable so as to control the amount and rate that carbon dioxide tracer 306 exits chamber 404.

Referring now to FIG. 5, in some embodiments, high pressure syringe device 500 includes a fluid 502, a reservoir 504, and a pressure source 506.

Fluid 502 is selected so as to be capable of dissolving carbon dioxide tracer 306. In some embodiments, fluid 502 is methanol or a similar solvent.

Reservoir 504 is configured to contain fluid 502 and carbon dioxide tracer 306 dissolved therein. Reservoir 504 includes a first inlet 508, a second inlet 510, and an outlet 512. First inlet 508 is configured to receive fluid 502. Second inlet 510 is configured to receive carbon dioxide tracer 306. Outlet 512 is in fluid communication with stream of carbon dioxide 308 for allowing fluid 502 and carbon dioxide tracer 306 dissolved therein to flow into the stream of carbon dioxide. In some embodiments, reservoir 504 includes a liquid membrane 514 for dissolving carbon dioxide tracer 306 in the fluid 502. One example of a suitable liquid membrane is the Liqui-Cel® Membranes manufactured by Membrana GmbH of Germany. Other membranes having similar characteristics are also acceptable.

In some embodiments, as indicated by arrows in FIG. 5, pressure source 506, which pressurizes high pressure syringe device 500 to force fluid 502 and carbon dioxide tracer 306 dissolved therein to exit outlet 512 of reservoir 504 and enter stream of carbon dioxide 308, is a syringe pump such as pump model 100DM manufacture by Teledyne Isco of Lincoln, Nebr., or similar.

In some embodiments, system 300 includes controls 516, 518 for controlling a partial pressure and a temperature of carbon dioxide tracer 306 to control the amount of the carbon dioxide tracer that dissolves in fluid 502.

One advantage of tagging $CO_2$ with $^{14}C$ is that by counting $^{14}C$ atoms one can in effect establish a mass balance and determine the total carbonate content of the reservoir. Subsequent to the $CO_2$ injection, sampling carbon, stored in the reservoir, in all its forms and analyzing its $^{14}C$ activity will be a direct measurement of the anthropogenic carbon content in the reservoir. For this purpose it does not matter whether the carbon encountered is supercritical $CO_2$, dissolved carbonate or bicarbonate in brine, organic carbon or any other form of carbon. The total $^{14}C$ count is directly proportional to the total amount of anthropogenic carbon in the reservoir. If for example, supercritical $CO_2$ were produced underground by dissolution of limestone, this analysis would clearly distinguish it from anthropogenic carbon, as it would lead to a reduced level of $^{14}C$ in the supercritical $CO_2$.

In determining the number of samples needed to establish a mass balance, even though it is possible to take a sufficient number of samples to obtain an accurate estimate without reference to other data, systems and methods according to the disclosed subject matter can be used in conjunction with geophysical tools to characterize the plume of $CO_2$ formed underground and thus reduce the number of samples required.

Another advantage is that untoward manipulation of numbers for accounting purposes is difficult. Adding too much $^{14}C$ will be detected, because in most locations the $^{14}C/^{12}C$ ratio will remain as it was set initially. Any indications of excess $^{14}C$ in the reservoir would therefore suggest manipulation or cheating.

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present invention.

What is claimed is:

1. A method of tagging carbon dioxide to be stored in a geologic formation, said method comprising:
providing a carbon dioxide tracer that is quantifiable and distinguishable versus non-anthropogenic produced carbon dioxide;
providing carbon dioxide to be stored in said geologic formation;
determining what portion of said carbon dioxide to be stored is anthropogenic produced carbon dioxide; and
mixing a predetermined quantity of said carbon dioxide tracer with said carbon dioxide stored to develop a tagged quantity of carbon dioxide for storage in said geologic formation.

2. The method according to claim 1, wherein said carbon dioxide tracer includes carbon-14.

3. The method according to claim 2, wherein said carbon dioxide tracer has a concentration of carbon-14 of about 1 part per trillion.

4. The method according to claim 1, wherein said predetermined quantity is based on maintaining a predetermined, naturally occurring ratio of non-anthropogenic produced carbon dioxide to anthropogenic produced carbon dioxide.

5. A method of monitoring carbon dioxide stored in a geologic formation, said method comprising:
measuring a quantity of a carbon dioxide tracer present in said geologic formation at a first time and at a second time subsequent to said first time, said carbon dioxide tracer being quantifiable and distinguishable versus non-anthropogenic produced carbon dioxide;
comparing said quantity of said carbon dioxide tracer present at said first time to said quantity of said carbon dioxide tracer present at said second time to develop a change in quantity of said carbon dioxide tracer; and
multiplying said change in quantity of said carbon dioxide tracer by a known concentration of said carbon dioxide tracer to determine a change in said volume of carbon dioxide stored in said geologic formation.

6. The method according to claim 5, further comprising:
determining a ratio of said anthropogenic produced carbon dioxide to said non-anthropogenic produced carbon dioxide; and
comparing said ratio to a naturally occurring ratio to verify proper amounts of said carbon dioxide tracer are present in said geologic formation.

7. The method according to claim 5, wherein said carbon dioxide tracer includes carbon-14.

8. The method according to claim 7, wherein said carbon dioxide tracer has a concentration of carbon-14 of about 1 part per trillion.

9. A system for tagging a stream of carbon dioxide being injected into a geologic storage reservoir, said system comprising:
a tagging module including a carbon dioxide tracer that is quantifiable and distinguishable versus non-anthropogenic produced carbon dioxide; and
a mixing module for containing and injecting said carbon dioxide tracer into said stream of carbon dioxide at a controlled flowrate over a period of time;
wherein said mixing module includes a microcartridge for injecting said carbon dioxide tracer into said stream of carbon dioxide, said microcartridge comprising:
an actuator reservoir including a fluid that does not mix with carbon dioxide, said actuator including means for pressurizing said fluid;
a chamber for storing said carbon dioxide tracer, said chamber including a sealable inlet for filling said chamber with said carbon dioxide tracer, an opening in fluid communication with said actuator reservoir, and an outlet to allow said carbon dioxide tracer to exit said chamber; and a nozzle in fluid communication with said outlet of said chamber; and wherein said means for pressurizing said fluid include a piezoelectric driver mechanism.

10. The system according to claim 9, wherein said carbon dioxide tracer includes carbon-14.

11. The system according to claim 10, wherein said carbon dioxide tracer has a concentration of carbon-14 of about 1 part per trillion.

12. A system for tagging a stream of carbon dioxide being injected into a geologic storage reservoir, said system comprising:

a tagging module including a carbon dioxide tracer that is quantifiable and distinguishable versus non-anthropogenic produced carbon dioxide; and a mixing module for containing and injecting said carbon dioxide tracer into said stream of carbon dioxide at a controlled flowrate over a period of time;

wherein said mixing module includes a microcartridge for injecting said carbon dioxide tracer into said stream of carbon dioxide, said microcartridge comprising:

an actuator reservoir including a fluid that does not mix with carbon dioxide, said actuator including means for pressurizing said fluid;

a chamber for storing said carbon dioxide tracer, said chamber including a sealable inlet for filling said chamber with said carbon dioxide tracer, an opening in fluid communication with said actuator reservoir, and an outlet to allow said carbon dioxide tracer to exit said chamber; and a nozzle in fluid communication with said outlet of said chamber; and wherein said means for pressurizing said fluid include a heating circuit for heating said fluid and causing it to thermally expand.

13. A system for tagging a stream of carbon dioxide being injected into a geologic storage reservoir, said system comprising:

a tagging module including a carbon dioxide tracer that is quantifiable and distinguishable versus non-anthropogenic produced carbon dioxide; and a mixing module for containing and injecting said carbon dioxide tracer into said stream of carbon dioxide at a controlled flowrate over a period of time;

wherein said mixing module includes a microcartridge for injecting said carbon dioxide tracer into said stream of carbon dioxide, said microcartridge comprising:

an actuator reservoir including a fluid that does not mix with carbon dioxide, said actuator including means for pressurizing said fluid;

a chamber for storing said carbon dioxide tracer, said chamber including a sealable inlet for filling said chamber with said carbon dioxide tracer, an opening in fluid communication with said actuator reservoir, and an outlet to allow said carbon dioxide tracer to exit said chamber; and a nozzle in fluid communication with said outlet of said chamber; and wherein said fluid is a non-toxic liquid metal-alloy.

14. The system according to claim 13, wherein said fluid is a gallium alloy.

15. A system for tagging a stream of carbon dioxide being injected into a geologic storage reservoir, said system comprising:

a tagging module including a carbon dioxide tracer that is quantifiable and distinguishable versus non-anthropogenic produced carbon dioxide; and a mixing module for containing and injecting said carbon dioxide tracer into said stream of carbon dioxide at a controlled flowrate over a period of time;

wherein said mixing module includes a high pressure syringe device for injecting said carbon dioxide tracer into said stream of carbon dioxide, said high pressure syringe device comprising:

a fluid capable of dissolving said carbon dioxide tracer;

a reservoir for containing said fluid and said carbon dioxide tracer dissolved therein, said reservoir including a first inlet for receiving said fluid, a second inlet for receiving said carbon dioxide tracer, and an outlet in fluid communication with said stream of carbon dioxide for allowing said fluid and said carbon dioxide tracer dissolved therein to flow into said stream of carbon dioxide; and a pressure source for supplying pressure to said high pressure syringe device thereby forcing said fluid and said carbon dioxide tracer dissolved therein in said reservoir to exit said outlet and enter said stream of carbon dioxide;

wherein said reservoir includes a liquid membrane for dissolving said carbon dioxide tracer in said fluid.

16. The system according to claim 15, further comprising controls for controlling a partial pressure and a temperature of said carbon dioxide tracer dissolved in said fluid.

17. A system for tagging a stream of carbon dioxide being injected into a geologic storage reservoir, said system comprising:

a tagging module including a carbon dioxide tracer that is quantifiable and distinguishable versus non-anthropogenic produced carbon dioxide; and a mixing module for containing and injecting said carbon dioxide tracer into said stream of carbon dioxide at a controlled flowrate over a period of time;

wherein said mixing module includes a high pressure syringe device for injecting said carbon dioxide tracer into said stream of carbon dioxide, said high pressure syringe device comprising:

a fluid capable of dissolving said carbon dioxide tracer;

a reservoir for containing said fluid and said carbon dioxide tracer dissolved therein, said reservoir including a first inlet for receiving said fluid, a second inlet for receiving said carbon dioxide tracer, and an outlet in fluid communication with said stream of carbon dioxide for allowing said fluid and said carbon dioxide tracer dissolved therein to flow into said stream of carbon dioxide;

a pressure source for supplying pressure to said high pressure syringe device thereby forcing said fluid and said carbon dioxide tracer dissolved therein in said reservoir to exit said outlet and enter said stream of carbon dioxide; and wherein said fluid is methanol or a similar solvent.

* * * * *